United States Patent
Mestach et al.

(10) Patent No.: US 6,730,740 B1
(45) Date of Patent: May 4, 2004

(54) AQUEOUS CROSS-LINKABLE POLYMER COMPOSITION FOR USE IN COATINGS AND PROCESS FOR PRODUCING THE SAME

(75) Inventors: Dirk Emiel Paula Mestach, Nijlen (BE); Maarten Johannes Jacobus Weber, Woensdrecht (NL); Genevieve Delaunoit, Begen op Zoom (NL); Wincenty Lambertus Stanislaw Pilaszek, Tholen (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/405,923

(22) Filed: Sep. 24, 1999

(30) Foreign Application Priority Data

Sep. 25, 1998 (EP) .............................................. 98203220

(51) Int. Cl.$^7$ .......................... C08L 33/00; C08L 33/02; C08L 79/02; C04D 133/00; C04D 179/02
(52) U.S. Cl. ........................ 525/192; 524/501; 524/512; 524/514; 524/521; 524/522; 524/538; 524/539; 524/542; 525/153; 525/155; 525/218; 525/220; 525/221; 525/163
(58) Field of Search .................................. 524/521, 522, 524/501, 512, 514, 538, 539, 542; 525/192, 194, 218, 220, 221, 153, 155, 163

(56) References Cited

U.S. PATENT DOCUMENTS

| 4,988,762 A | * | 1/1991 | Overbeck et al. | ............ 524/839 |
| 5,859,112 A | * | 1/1999 | Overbeck et al. | ............ 524/460 |
| 5,962,571 A | * | 10/1999 | Overbeck et al. | ............ 524/460 |

FOREIGN PATENT DOCUMENTS

| EP | 0 587 333 | 3/1994 | ......... C08F/265/06 |
| WO | WO95/29944 | 11/1995 | ......... C08F/265/04 |

* cited by examiner

*Primary Examiner*—Kelechi C. Egwim
(74) *Attorney, Agent, or Firm*—Joan M. McGillycuddy; Michelle J. Burke

(57) ABSTRACT

The invention pertains to an aqueous cross-linkable polymer composition comprising: W a) a water-soluble first polymer comprising acid groups, which is at least partially neutralized with a volatile base;

b) a dispersion of a substantially water-insoluble second polymer, which comprises carbonyl-functional groups, which may be produced by emulsion polymerization in the presence of an aqueous solution of the first polymer;

c) a cross-linking agent which can react by condensation with the carbonyl-functional groups of the second polymer; and d) a water-soluble, amine-functional third polymer.

12 Claims, No Drawings

AQUEOUS CROSS-LINKABLE POLYMER COMPOSITION FOR USE IN COATINGS AND PROCESS FOR PRODUCING THE SAME

The present invention pertains to aqueous cross-linkable polymer compositions for use in coatings and to a process for preparing the same.

BACKGROUND OF THE INVENTION

Due to increasingly stringent environmental regulations concerning the allowable content of volatile organic compounds in coatings, major efforts have been made to minimize the use of organic co-solvents in water borne coatings based on acrylic binders. However, in water borne coatings that use acrylic polymers as the main binder, the final hardness after curing of an applied coating film is often limited by the amount of organic co-solvent in the coating formulation. The organic solvent is required to lower the film-formation temperature in order to ensure proper coalescence of the polymer particles during the film-forming process. For some coating applications a minimal hardness is required, for example, if a high blocking resistance or scratch resistance is important. The hardness can be increased by raising the glass transition temperature of the acrylic polymer. However, when this coating is applied and dried at ambient temperature this often leads to poor film formation because of the limited amount of coalescing aid allowed. This poor film formation results in reduced gloss, low chemical resistance, and weathering.

Attempts have been made to lower the necessary content of volatile organic compounds in coatings by using two-component coating systems. In order to increase hardness, the two components should cross-link, for which a cross-linker is needed. Such cross-linkers, e.g., polyaziridine or polyisocyanate, often have a toxic nature. Two-component coating systems also show the general drawback that after mixing of the two components the pot life is limited.

A composition and a process of the type according to the opening paragraph are known from PCT patent application WO 95/29944. This publication discloses a process for the production of an aqueous polymer composition for use as a coating with improved hardness and low film forming temperature. Use is made of a cross-linking agent which links the first, water-soluble polymer with the second, hydrophobic polymer. The cross-linking agent reacts by condensation. The lower the water concentration, the more this reaction takes place. It was found that the cross-linking reaction proceeds relatively slowly and begins only after evaporation of all the water in the film. As a result, the early hardness and water resistance are relatively low.

European patent application EP-A 0 587 333 discloses a water-resistant polymer dispersion containing a carboxylated water-soluble polymer which is neutralized and solubilized with, e.g., ammonia. An alkali-insoluble emulsion polymer is prepared in the presence of the water-soluble first polymer. The alkali-insoluble polymer may contain an amine functionality. The composition may comprise a water-soluble polymer with an amine functionality, which serves to neutralize the soluble polymer, as an alternative for the ammonia. During preparation, the two stages are grafted together. Metal ions may be incorporated into the monomer mixture so as to create ionic metal/carboxylate cross-links. The water-soluble stage polymer remains susceptible to bases, which may cause resolubilization when a second layer of paint is applied. The hydrophobic polymer remains thermoplastic and does not cross-link, so that after application the resulting coating film shows a limited hardness.

A common problem with aqueous polymer compositions comprising polymer dispersions with polymers having carboxylic acid-functional groups, is their poor water resistance and poor recoatability, since the water-soluble polymer will easily redissolve in the presence of water or, when a second layer of water-borne paint is applied, under the influence of the present neutralizing base.

The object of the present invention is a polymer composition which can be used as a binder in water borne coatings with a low content of volatile organic compounds, which shows rapid hardness development and good film formation. Another object of the present invention is a process for making such a composition.

This object of the invention is achieved with a composition of the above-described type, wherein the composition further comprises a water-soluble third polymer with an amine functionality.

SUMMARY OF THE INVENTION

One embodiment of the invention relates to an aqueous cross-linkable polymer composition comprising:
a) a water-soluble first polymer comprising acid groups, wherein said first polymer is at least partially neutralized with a volatile base;
b) a dispersion of a substantially water-insoluble second polymer, said second polymer comprising carbonyl-functional groups; said second polymer produced by emulsion polymerization in the presence of an aqueous solution of the first polymer;
c) a cross-linking agent capable of undergoing a condensation reaction with the carbonyl-functional groups of the second polymer; and
d) a water-soluble, amine-functional third polymer.

In another embodiment, the invention relates to a process for preparing such an aqueous polymer composition.

DETAILED DESCRIPTION OF THE INVENTION

More specifically, the present invention pertains to an aqueous cross-linkable polymer composition comprising:
a) a first polymer, which comprises acid groups and is made water-soluble by the addition of a volatile base;
b) a dispersion of a second polymer, which comprises carbonyl-functional groups and which is water-insoluble;
c) a cross-linking agent which can react by condensation with the carbonyl-functional groups of the second polymer; and
d) a third polymer, which is water-soluble and has an amine functionality.

As a result, two different cross-linking reactions will occur after application of the composition according to the invention as a coating. Upon evaporation of the volatile base used to at least partially neutralize the acid groups of the water-soluble first polymer, the amine functionality of the water-soluble third polymer will form ionic bonds with the acid groups of the first polymer. The second cross-linking reaction takes place after evaporation of the water via reaction of the carbonyl-functional groups of the hydrophobic second polymer with the cross-linking agent. The first curing reaction is fast and is responsible for rapid initial hardness development. The second curing reaction is a slow covalent cross-linking and is responsible for the ultimate mechanical properties of the coating. Using a polymer composition according to the present invention, clear as well as pigmented coatings with volatile organic contents below 100 g/liter can be formulated, which have a high hardness, high gloss, high chemical resistance, and good weathering properties after curing.

Coatings comprising a polymer composition according to the present invention can be applied to various substrates, such as metal, wood, paper, cardboard, gypsum, concrete, plastic, etc. Various known application methods may be used, such as brushing, spraying, rolling, dipping, printing, etc. In particular, a polymeric composition according to the present invention can be used in pigmented coating compositions for application directly onto metal (self-priming systems) or as a primer or a top coat for metal, or as a primer, clear coat, or top coat for wood.

The object of the invention is also achieved with a process comprising the steps of:

a) preparing an aqueous solution of an acid-functional first polymer, which is made water-soluble by the addition of a volatile base;

b) preparing by emulsion polymerization in the presence of the aqueous solution of the first polymer, a dispersion of a substantially water-insoluble second polymer comprising carbonyl-functional groups;

c) adding a cross-linking agent which can react with the functional groups of the second polymer, d) adding a third polymer with an amine functionality to the polymer dispersion after the preparation of the dispersion of the second polymer, optionally after addition of volatile base to the dispersion of the first polymer, the second polymer, and the cross-linking agent, until the pH has a value between 8 and 11.

Alternatively, after the preparation of the water-insoluble second polymer dispersion and the addition of a cross-linking agent which can react with the functional groups of the second polymer, also a third polymer with an amine functionality and a cross-linking agent can be added.

The first polymer may be obtained from ethylenically unsaturated monomers, preferably esters of acrylic and methacrylic acid such as n-butyl (meth)acrylate, methyl (meth)acrylate, ethyl (meth)acrylate, 2-ethylhexyl (meth)acrylate, cycloalkyl (meth)acrylates, e.g., isobornyl (meth)acrylate and cyclohexyl (meth)acrylate, or an ethylenically unsaturated compound such as styrene, e.g., normal styrene or substituted styrenes, for instance α-methyl styrene or tert-butyl styrene; vinyl toluene; dienes such as 1,3-butadiene or isoprene, or mixtures thereof. Also vinyl esters, such as vinyl acetate, vinyl alkanoate or their derivatives or mixtures thereof can be used in the monomer composition. Nitriles, such as (meth)acrylonitrile, or olefinically unsaturated halides, such as vinyl chloride, vinylidene chloride, and vinyl fluoride can also be used. The monomer composition also contains unsaturated monomers with acid-functionality. The acid groups of the first polymer are preferably carboxylic acid groups. Unsaturated monomers with one or more carboxylic acid groups are very useful. Optionally, the acid groups are latent as, for example, in maleic anhydride, where the acid-functionality is present in the form of an anhydride group. Also macromonomers comprising one or more carboxylic acid-functional groups can be used. Preferably, monomers such as (meth)acrylic acid are used. Other possible carboxylic acid-functional monomers are oligomerized acrylic acids such as β-carboxyethylacrylate and its higher analogues (commercially available from Rhodia as Sipomer B-CEA), itaconic acid, fumaric acid, maleic acid, citraconic acid, dimeric acrylic acid, or the anhydrides thereof. Besides monomers having carboxylic acid-functionality also monomers possessing a further acid-functional group besides the carboxylic one can be present in the monomer composition, such as sulfonic acid groups, by the copolymerization of monomers such as ethylmethacrylate-2-sulfonic acid or 2-acrylamido-2-methylpropane sulfonic acid, phosphoric or phosphonic groups obtained from monomers such as 2-methyl-2-propenoic acid ethyl-2-phosphate ester (HEMA-phosphate), (1-phenylvinyl)phosphonic acid, or (2-phenylvinyl)-phosphonic acid. Other monomers possessing a further functional group besides the acidic one can also be present in the monomer composition. Examples of such monomers are hydroxy-functional monomers such as hydroxyethyl (meth)acrylate, hydroxypropyl (meth)acrylate, hydroxybutyl (meth)acrylate, (meth)acrylamide or derivatives of (meth)acrylamide such as N-methylol (meth)acrylamide and diacetone acrylamide. Also the adducts of hydroxy-functional monomers with ethylene or propylene oxide can be present in the monomer composition.

Preferably, the water-soluble first polymer is a copolymer obtainable by emulsion polymerization of styrene, (meth)acrylic acid, and one or more other (co)monomers, e.g., (meth)acrylic esters and/or (meth)acrylamide derivatives. The term "(meth)acryl" means "acryl" and/or "methacryl."

Preferably, the water-soluble first polymer further comprises carbonyl-functional groups, which may be keto or aldo groups. As a result, covalent cross-linking will take place with the water-soluble first polymer as well as with the water-insoluble polymer. Preferably, the carbonyl-functional groups are introduced into the water-soluble first polymer by copolymerizing diacetone acrylamide.

The preparation of the water-soluble first polymer can be carried out by means of various techniques, such as solution polymerization, bulk polymerization or emulsion polymerization.

The number average molecular weight of the water-soluble first polymer preferably is between 750 and 15,000. More preferably, the number average molecular weight is between 2,000 and 12,000, most preferably between 5,000 and 9,000. Chain transfer agents, such as mercaptans, can be used to control the number average molecular weight of the polymer.

Preferably, the volatile base is ammonia. Other suitable bases are, for example, volatile amines, such as aminomethylpropanol, dimethylethanolamine or 2-dimethylamino-2-methyl-1-propanol, triethylamine or monoethanolamine. Optionally, a mixture of different volatile bases can be used.

The water-insoluble second polymer may be a homo- or copolymer prepared using esters of acrylic or methacrylic acid such as methyl (meth)acrylate, ethyl (meth)-acrylate, butyl (meth)acrylate, 2-ethylhexyl (meth)acrylate, isobornyl (meth)-acrylate, cyclohexyl (meth)acrylate or an ethylenically unsaturated compound such as styrene, vinyl toluene or α-methyl styrene, o-, m-, and p-methylstyrene, o-, m-, and p-ethylstyrene, p-chlorostyrene, and p-bromostyrene. Also vinyl esters such as vinyl alkanoates (for example the vinyl esters of versatic acids, which are commercially available under the trademark VeoVa 9, VeoVa 10 and VeoVa 11, ex Shell Chemicals), and vinyl acetate and its derivatives; vinyl halides such as vinyl chloride; vinylidene halides such as vinylidene chloride; dienes such as 1,3-butadiene, and isoprene can be used in the monomer composition. The monomer composition can also contain minor amounts of carboxylic acid-functional monomers such as (meth)acrylic acid and monomers possessing a second functional group such as amino or ethylene ureido groups. The carbonyl-functional groups of the hydrophobic second polymer are preferably based on aldo or keto groups for imparting cross-linking through the formation of covalent bonds. Specific monomers that can be used in the copolymerization to introduce these groups include, but are not limited to, (meth)acrolein, diacetone acrylamide, formyl styrol, diacetone acrylate, acetonitrile acrylate, diacetone methacrylate, 2-hydroxypropyl acrylate acetyl acetate, butanediol-1,4 acrylate acetyl acetate, or a vinyl alkyl ketone, e.g., vinyl methyl ketone, vinyl ethyl ketone or vinyl butyl ketone.

Very good results are obtained if both the water-soluble first polymer and the water-insoluble second polymer are prepared by copolymerizing diacetone acrylamide monomer with the other monomers. In this case, the carbonyl-functional groups of the first and the second polymer will be the carbonyl groups of the polymerization product of diacetone acrylamide monomer with the other monomers, such as those mentioned herein.

The hydrophobic second polymer may be, and is preferably, prepared by emulsion polymerization in the presence of an aqueous solution of the water-soluble first polymer. Additional emulsifying agents can be used.

Emulsifying agents that can be used for the emulsion polymerization of the water-soluble first polymer and/or the water-insoluble second polymer are, for example, anionic and/or non-ionic emulsifiers. Anionic emulsifiers include, but are not limited to, alkylethoxylate sulfate and sulfonate, alkylphenolethoxylate sulfate and sulfonate, alkylsulfate and sulfonate, alkylethoxylate phosphates, alkylphenol ethoxylate phosphates, alkyl phosphates, alkylaryl sulfonates, sulfosuccinates, and mixtures thereof. Non-ionic surfactants include, but are not limited to, alkylaryl polyether alcohols, alkylphenol ethoxylates, alkyl ethoxylates, ethylene oxide block copolymers, propylene oxide block copolymers, polyethylene oxide sorbitan fatty acid esters, and mixtures thereof. Preferably, the amount of emulsifying agent used is between 0.3 to 2% by weight, based on the weight of the total amount of monomer. More preferred is the use of an amount of emulsifying agent of 0.3 to 1% by weight. Preferably, no additional emulsifiers are used in the emulsion polymerization of the water-insoluble second polymer if the water-soluble first polymer is also prepared by emulsion polymerization.

In a preferred embodiment of the composition according to the invention, the weight ratio of the first, water-soluble polymer to the second, hydrophobic polymer is between 60/40 and 5/95, more preferably between 35/65 and 15/85.

If the water-soluble first polymer and/or the water-insoluble second polymer are prepared by emulsion polymerization, the polymerization can be initiated with free-radical forming initiators such as alkali persulfate, ammonium persulfate, azo-bis-isobutyronitrile, 4,4'-azo-bis-cyanovaleric acid, organic (hydro)peroxides or peresters, such as tert-butyl hydroperoxide or tert-butyl perpivalate. The radicals can be formed, for instance, by heating the reaction mixture or by the use of a reducing compound, optionally combined with a metal salt. Reducing compounds are sodium pyrosulfite, sodium formaldehyde sulfoxylate, ascorbic acid, and the like. Depending on the initiation system that is used, the reaction temperature generally is between 20 and 95° C.

The amine-functional third polymer can be prepared, for example, by ring opening polymerization of heterocyclic monomers, such as ethanimine, 1-propanimine, azetidine, azetidine derivatives, or mixtures thereof. A suitable polyethylene imine that can be used is commercially available under the trademark Lupasol® FG or Lupasol® FC ex BASF. Alternatively, the third, amine-functional polymer can be prepared by radical polymerization of α,β-ethylenically unsaturated amine-functional monomers, such as dimethylaminoethyl methacrylate, tert-butyl aminoethyl methacrylate, or mixtures thereof. A third possible method to produce the amine-functional third polymer is by using monomers containing a blocked amine group such as aldimine, ketimine, enamine or, preferably, oxazolidine. Mixtures of monomers containing a blocked amine group may also be used. These compounds can be hydrolyzed into primary and secondary amines. Preferably, the amine-functional third polymer is poly(dimethylaminoethyl methacrylate). It is also preferred that the amine-functional third polymer has a number average molecular weight from 500 to 100,000, more preferably from 1,000 to 80,000. The amount of amine-functional third polymer preferably ranges from 0.1 to 5%, based on the weight of the first and second polymers.

The cross-linking agent can be a hydrazine-functional agent, preferably a hydrazide-functional agent, more preferably a dihydrazide, e.g., a dicarboxylic acid dihydrazide such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, itaconic acid dihydrazide, phthalic acid dihydrazide, or terephthalic acid dihydrazide. Alternatively, the cross-linking agent can be a water-soluble aliphatic dihydrazine, such as ethylene-1,2-dihydrazine, propylene-1,3-dihydrazine, and butylene-1,4-dihydrazine, or a polyamine such as isophorone diamine or 4,7-dioxadecane-1,10-diamine. Preferably, the cross-linking agent is adipic dihydrazide.

If so desired with regard to the end use, the aqueous polymer composition of the present invention may further contain various additives such as dispersants, lubricants, anti-foaming agents, solvents, film formation aids, plasticizers, anti-freezing agents, waxes, preservatives, thickeners, etc.

The polymer composition may be used as a clear varnish or may contain pigments. Examples of pigments suitable for use are metal oxides, such as titanium dioxide or iron oxide, or other inorganic or organic pigments.

EXAMPLE 1

Preparation of a Hydrophilic Carboxylic Acid-functional First Polymer

A carboxylic acid-functional hydrophilic polymer for use in a composition according to the present invention was obtained in the following way.

A reactor was charged with the components according to Table I (weight of ingredients is expressed as in parts by weight (pbw)).

TABLE I

| Component, amounts in parts by weight (pbw) | Amount (pbw) |
| --- | --- |
| H$_2$O (demineralized) | 133.9 |
| Nonylphenol-15-ethyloxide sulfate sodium salt (35% solution in water) | 0.7 |
| Nonylphenol-20-ethyloxide (80% solution in water) | 0.6 |
| Dodecylbenzene sulfonic acid (free acid, 100% active) | 0.5 |
| Sodium hydroxide (33% aqueous solution) | 0.2 |

The charged reactor was heated to 90° C. under a nitrogen blanket. When the batch had reached 90° C., a first initiator solution containing 0.3 pbw of sodium persulfate in 2.2 pbw of demineralized water was added. A pre-emulsion was made according to the following Table II.

TABLE II

| Component | Amount (pbw) |
|---|---|
| Demineralized water | 223.5 |
| Nonylphenol-15-ethyloxide sulfate sodium salt (35% solution in water) | 4.2 |
| Nonylphenol 20 ethyloxide (80% solution in water) | 3.7 |
| Dodecylbenzene sulfonic acid (100%, free acid) | 3.0 |
| Sodium hydroxide (33% aqueous solution) | 1.1 |
| 2-Hydroxyethyl methacrylate | 5.2 |
| Methacrylic acid | 36.8 |
| Methyl methacrylate | 76.1 |
| Butyl acrylate | 34.6 |
| Styrene | 19.7 |
| Mercapto ethanol | 2.4 |

This pre-emulsion was dosed in 120 minutes. Simultaneously a second initiator containing 2.0 pbw of sodium persulfate and 38.6 pbw of demineralized water was dosed in 150 minutes. After this addition, the batch was kept at 90° C. for 30 minutes. Then the batch was cooled to 70° C. A solution of 31.5 pbw of ammonia (a 25% aqueous solution) and 376.2 pbw of demineralized water was then added as a neutralization to dissolve the polymer. The solution was then cooled to 30° C.

EXAMPLES 2, 3, and 4

Preparation of Polymer Compositions

For comparative tests with prior art compositions and a composition according to the invention, three polymer compositions were made using the first polymer from Example 1. The polymer dispersion of Comparative Example 2 was made as specified in EP 0,587,333. The polymer dispersion of Comparative Example 3 is similar to the dispersion of Example 2 but differs in that it is keto-hydrazide modified by using the diacetone acrylamide monomers and by dissolving adipic dihydrazide in the aqueous phase. As a result, the polymer dispersion of Comparative Example 3 is in accordance with WO 95/29944. The dispersion according to Example 4 has a harder hydrophobic polymer which contains diacetone acrylamide, but the dispersion does not contain adipic hydrazide as a cross-linking agent.

TABLE III

| Reactor charge | Example 2 (Comparative) | Example 3 (Comparative) | Example 4 |
|---|---|---|---|
| Stabilizing resin of Example 1 | 196.8 | 191.3 | 196.6 |

The batch was heated to 90° C. A pre-emulsion was made of the following components:

TABLE IV

| Pre-emulsion | Example 2 (Comparative) | Example 3 (Comparative) | Example 4 |
|---|---|---|---|
| Stabilizing resin of Example 1 | 459.0 | 446.1 | 458.7 |
| Butyl acrylate | 134.5 | 130.7 | |
| Butyl methacrylate | 13.4 | 13.1 | |
| Styrene | | | 71.7 |
| 2-ethylhexyl acrylate | | | 105.2 |
| Methyl methacrylate | 127.4 | 123.8 | 84.0 |

TABLE IV-continued

| Pre-emulsion | Example 2 (Comparative) | Example 3 (Comparative) | Example 4 |
|---|---|---|---|
| Methacrylic acid | 5.7 | 5.6 | 8.6 |
| Nourycryl ® MA 123 | 5.2 | 5.0 | 8.6 |
| Diacetone acrylamide | | 13.9 | 8.6 |

Nourycryl MA123 is a 50% solution in methylmethacrylate of ethylene ureum ethylmethacrylate ex Akzo Nobel.

An initiator solution was made according to the following Table V.

TABLE V

| Initiator solution | Example 2 (Comparative) | Example 3 (Comparative) | Example 4 |
|---|---|---|---|
| Demineralized water | 56.2 | 54.6 | 56.2 |
| Sodium persulfate | 0.8 | 0.8 | 0.8 |

When the batch reached 90° C., this pre-emulsion was dosed in 180 minutes and the initiator was dosed in 195 minutes. The batch was kept at 90° C. for an additional 30 minutes and then cooled down to 30° C. The pH of the batch was then adjusted to 7.5 with a 25% aqueous ammonia solution. Subsequently the following solution was added:

TABLE VI

| Finishing | Example 2 (Comparative) | Example 3 (Comparative) | Example 4 |
|---|---|---|---|
| Adipic dihydrazide | | 14.3 | |
| Proxel ® XL2 | 1.0 | 1.0 | 1.0 |

Proxel ® XL2 is a compound based on benzoisothiazolones.
Proxel ® is a trademark of Zeneca.

EXAMPLE 5

A first sample A was made of the polymer dispersion of Comparative Example 2. A second sample B was made of the polymer dispersion of Comparative Example 3. A third sample C was made of the dispersion of Comparative Example 3 and was modified with 1.16 wt. % based on solids of a polyethylene imine with a molecular weight of 700 (abbreviated as PEI700).

Samples A, B, and C were then applied to a glass plate and dried at 23° C. After one day the König hardness was measured (in accordance with ASTM D-4366). After seven days the hardness was measured again. From the table below the effect of the polyamine modification in combination with the keto/hydrazide reaction is clear.

TABLE VII

| Resin | König hardness after 1 day | König hardness after 7 days |
|---|---|---|
| A (Comparative) | 70 | 71 |
| B (Comparative) | 86 | 93 |
| C (= B + PEI700) | 100 | 107 |

It was also found that the water resistance had improved substantially.

EXAMPLE 6

Similar effects to those in Example 5 were observed when a dispersion according to Example 4 was used. Three samples were made with this binder. In sample 1 the binder was not modified. In sample 2 the binder was modified with 0.89 wt. % based on solids of adipic hydrazide. In sample 3 the binder was modified with both 0.89 wt. % based on solids of adipic hydrazide and 1.16 wt. % based on solids of PEI700. Hardness results are given in the table below.

TABLE VII

| Sample | König hardness after 1 day | König hardness after 7 days |
|---|---|---|
| 1 (Comparative) | 87 | 90 |
| 2 (Comparative) | 87 | 90 |
| 3 | 127 | 125 |

Also in this case an improved water resistance was observed where the two cross-linking mechanisms were combined.

EXAMPLES 7, 8, 9, and 10

The effect of the addition of a polyamine is also clear in pigmented coatings. In order to evaluate these effects a number of polymer compositions were prepared with a constant composition of the water-insoluble polymer and a glass transition temperature of 25° C. The water-soluble first polymer was the same in all cases. Different polyamines were used to modify the binders.

TABLE VIII

| Reactor charge | Example 7 | Example 8 | Example 9 | Example 10 |
|---|---|---|---|---|
| Stabilizing resin (Example 1) | 188.4 | 183.7 | 183.7 | 154.6 |

The batch was heated to 90° C. A pre-emulsion was made of the following components.

TABLE IX

| Pre-emulsion | Example 7 | Example 8 | Example 9 | Example 10 |
|---|---|---|---|---|
| Stabilizing resin of Example 1 | 439.6 | 428.7 | 428.6 | 359.9 |
| Styrene | 70.3 | 68.6 | 68.6 | 58.0 |
| 2-ethylhexyl acrylate | 88.2 | 86.1 | 86.1 | 72.5 |
| Methyl methacrylate | 97.4 | 95.0 | 95.0 | 79.7 |
| Methacrylic acid | 8.4 | 8.2 | 8.2 | 7.3 |
| Nourycryl ® MA 123 | 8.4 | 8.2 | 8.2 | 7.3 |
| Diacetone acrylamide | 8.4 | 8.2 | 8.2 | 7.3 |
| Demineralized water | | 20.5 | 20.5 | 16.9 |

An initiator was made according to the following Table X.

TABLE X

| Initiator solution | Example 7 | Example 8 | Example 9 | Example 10 |
|---|---|---|---|---|
| Demineralized water | 55.1 | 53.7 | 53.7 | 44.7 |
| Sodium persulfate | 0.8 | 0.8 | 0.8 | 1.2 |
| Demineralized water | | 4.4 | 4.4 | 3.6 |

When the batch reached 90° C., this pre-emulsion was dosed in 180 minutes and the initiator was dosed in 195 minutes. The batch was kept at 90° C. for an additional 30 minutes and then cooled down to 30° C. The pH of the batch was then adjusted to 7.5 with a 25% aqueous ammonia solution. Subsequently the following solution was added:

TABLE XI

| Finishing | Example 7 | Example 8 | Example 9 | Example 10 |
|---|---|---|---|---|
| Adipic dihydrazide | 5.3 | 5.2 | 5.2 | 4.8 |
| Proxel ® XL2 | 1.0 | 1.0 | 1.0 | 1.2 |
| Ammonia (25% aqueous solution) | 6.1 | 5.1 | 5.1 | 4.8 |
| Lupasol ® G 20 | | | 22.6 | |
| Poly(dimethylaminoethylmethacrylate) solution | | | | 176.3 |
| Polyethylene imine (MW 700) | 11.3 | 11.3 | | |
| Demineralized water | 11.3 | 11.3 | | |

The poly(dimethylaminoethyl methacrylate) of Example 10 was made by mixing a solution of 0.004 pbw of $FeSO_4 \cdot 7H_2O$ in 2.72 pbw of demineralized water and a solution of 0.008 pbw of ethylene diaminotetra-acetate in 0.8 pbw of demineralized water in a batch of 506.8 pbw of demineralized water heated to 65° C. After reaching this temperature a solution of 194.9 pbw of dimethylaminoethyl methacrylate in 194.9 pbw of demineralized water, a solution of 2 pbw of tert-butyl hydroperoxide (70% aqueous solution) in 36.8 pbw of demineralized water, and a solution of 2 pbw of sodium formaldehyde sulfoxylate in 36.8 pbw of demineralized water were dosed in 120 minutes. Feed lines were then rinsed with demineralized water. The batch was kept at 65° C. for 60 minutes. Then 0.3 pbw of tert-butyl hydroperoxide (70% aqueous solution) and a solution of 0.06 pbw of sodium formaldehyde sulfoxylate in 2 pbw of demineralized water were added. The batch was kept at 65° C. for another 60 minutes. Next, the batch was cooled to 30° C. and 4.5 pbw of ammonia (25% aqueous solution) was added. A clear aqueous solution of poly(dimethylaminoethyl methacrylate) with a solids content of 16% was obtained. Gel permeation chromatography using hexafluoroisopropanol as eluent gave a number average molecular weight of 52,000 (against polymethyl methacrylate standards)

Finally, the sample of Example 8 was modified with 1.16 wt. % based on solids of polyethylene imine with a molecular weight of 700, while the sample of Example 9 was modified with 1.16 wt. % based on solids of a commercial quality polyethylene imine (Lupasol® G20 ex BASF) with a molecular weight of 1300.

Subsequently, 25.1 pbw of the dispersion of Example 4 was mixed with 75.2 pbw of demineralized water; 1 pbw of a dispersant (e.g., Orotan® 1124 ex Rohm and Haas), 0.5 pbw of defoamer (e.g., Dehydran® 1620 ex Henkel), 1 pbw of aminomethyl propanol, and 175.5 pbw of titanium dioxide. This mixture was ground until the mean particle size was less than 10 μm. This premix was then mixed further with 17.6 pbw of demineralized water, 1 pbw of defbamer (e.g., Dehydran® 1620 ex Henkel), 1.5 pbw of polyether modified dimethyl siloxane copolymer (e.g., Byk® 333 ex Byk), 20.1 pbw of butyl glycol, 5.0 pbw of a rheology modifier (e.g., Acrysol® RM 5 solution ex Rohm and Haas) 2.5 pbw of Forbest® 600 ex Lucas Meyer GmbH, and 2.5 pbw of dibutyl phthalate. This mixture was then added, under agitation, to the pigment paste, after which the whole was added to 668.7 pbw of the dispersions of Examples 7, 8, 9, and 10 together with 2.8 pbw of ammonia (25% aqueous solution) until pH 9. The resulting coating was then applied onto a glass substrate and evaluated after three days of drying at 23° C. Test results are given in the following Table XII (König and Persoz hardness in accordance with ASTM D-4366.):

TABLE XII

| Example: | 7 | 8 | 9 | 10 |
|---|---|---|---|---|
| König hardness | 82 | 104 | 104 | 110 |
| Persoz hardness | 171 | 199 | 199 | 215 |
| Acetone rubs | <7 | <25 | <15 | <25 |
| Xylene resistance after 1 min. exposure | | | | |
| Lifting | L3 | L2 | L2 | L2 |
| Swelling | S4 | S2 | S3 | S2 |
| Water resistance after 1 hour exposure | | | | |
| Blisters | B2 | B1 | B1 | B3 |
| Lifting | L3 | L1 | L2 | L2 |
| Swelling | S4 | S3 | S3 | S3 |

Remarks:
B = blisters, L = lifting, S = swelling, 1 = perfect, 5 = poor

EXAMPLE 11

Samples of coating compositions comprising co-solvents were made in this example. The co-solvents were added for optimizing gloss and flow properties. In these compositions both the water-soluble first polymer and the water-insoluble second polymer contain carbonyl-functional groups derived from diacetone acrylamide.

First a stabilizing resin was made via emulsion polymerization. A phosphate ester based surfactant was used, for example Rhodafac™ RS710 ex Rhodia. A reactor was charged with compounds according to the following Table XIII.

TABLE XIII

| Reactor charge | Amount (pbw) |
|---|---|
| Demineralized water | 134.7 |
| Rhodafac ® RS710 | 1.2 |
| Sodium hydroxide (33% solution in water) | 0.2 |

The charged reactor was heated to 90° C. under a nitrogen blanket. When the batch reached 90° C., a first initiator solution containing 0.3 pbw of sodium persulfate in 2.1 pbw of demineralized water was added. A pre-emulsion was made according to the following Table XIV.

TABLE XIV

| Component | Amount (pbw) |
|---|---|
| Demineralized water | 224.7 |
| Rhodafac ® RS710 (phosphate ester surfactant) | 7.4 |
| Sodium hydroxide (33% solution in water) | 1.1 |
| Methacrylic acid | 37.1 |
| Methyl methacrylate | 76.5 |
| Diacetone acrylamide | 6.8 |
| Butyl acrylate | 34.8 |
| Styrene | 19.8 |
| Mercapto ethanol | 2.4 |

This pre-emulsion was dosed in 120 minutes. A second initiator containing 2.1 pbw of sodium persulfate and 38.9 pbw of demineralized water was simultaneously dosed in 150 minutes. After this addition, the batch was kept at 90° C. for 30 minutes. Then the batch was cooled to 70° C. A solution of 31.7 pbw of ammonia (25% aqueous solution) and 378.3 pbw of demineralized water was then added as a neutralization to dissolve the polymer. Next, the solution was cooled to 30° C.

In the resulting aqueous solution a hydrophobic second polymer was prepared by the following steps. First a reactor was charged with 187.6 pbw of the solubilized resin. This batch was then heated to 90° C., while a pre-emulsion was made with the following components:

TABLE XV

| Pre-emulsion | Amounts (pbw) |
|---|---|
| Stabilizing resin | 438.0 |
| Styrene | 68.6 |
| 2-ethylhexyl acrylate | 86.1 |
| Methyl methacrylate | 95.0 |
| Methacrylic acid | 8.2 |
| Nourycryl ® MA-123 | 8.2 |
| Diacetone acrylamide | 8.2 |

When the batch reached 90° C., this pre-emulsion was dosed in 180 minutes and an initiator comprising 53.7 pbw of demineralized water and 0.7 pbw of sodium persulfate was dosed in 195 minutes. Feeding lines were rinsed with 25.7 pbw of demineralized water. The batch was kept at 90° C. for an additional 30 min and then cooled down to 30° C. Subsequently a cross-linker solution comprising 10.9 pbw of demineralized water and 7.9 pbw of adipic bishydrazide was added together with 1.0 pbw of a biocide, for example Proxel® XL2. The pH of the batch was then adjusted to about 9 with a 25% aqueous ammonia solution.

A second resin solution of poly(dimethylaminoethyl methacrylate) was made by mixing a solution of 0.005 pbw of $FeSO_4.7H_2O$ in 3.52 pbw of demineralized water and a solution of 0.01 pbw of ethylene diaminotetra acetate in 1 pbw of demineralized water in a batch of 402.8 pbw of demineralized water heated to 65° C. After this temperature was reached, a solution of 251.8 pbw of dimethylaminoethyl methacrylate in 201.4 pbw of demineralized water, a solution of 2.5 pbw of tertiary butyl hydroperoxide (70% aqueous solution) in 47.5 pbw of demineralized water, and a solution of 2.5 pbw of sodium formaldehyde sulfoxylate in 50.4 pbw of demineralized water were dosed in 120 minutes. Feed lines were rinsed with 20.1 pbw of demineralized water. The batch was kept at 65° C. for 60 minutes. Then 0.33 pbw of tertiary butyl hydroperoxide (70%) and a solution of 0.08 pbw of sodium formaldehyde sulfoxylate in 2.5 pbw of demineralized water were added. The batch was kept at 65° C. for another 60 minutes. Then the batch was cooled to 30° C. and 13.4 pbw of ammonia (25% aqueous solution) were added.

The final composition was made by mixing 177.3 pbw of the poly(dimethylaminoethyl methacrylate) solution with 814.6 pbw of the first solution and 8.15 pbw of ammonia (25% aqueous solution).

A pigment paste was made of 172 pbw of the resulting resin, which was mixed with 127.4 pbw of demineralized water, 6.4 pbw of Orotan® 1124, 3.2 pbw of Surfynol® CT-136 (trademark of Air products), 6.4 pbw of AMP® 90, 8.5 pbw of Lancowax® TF 1778 (trademark of Langer & Co), and 671 pbw of TiPuree 706 and 5.3 pbw of Forbest® 600.

Three samples of coating compositions were then prepared by mixing 300.5 pbw of the prepared pigment paste with 637.3 pbw of the prepared resin, 1.4 pbw of Dehydran® 1620, 2 pbw of Byk® 348 and 19.6 pbw of Viscalex® HV-30 (trademark of Ciba Specialty Chemicals). In the first sample, sample A, 39.2 pbw of butyl glycol was added. In the second sample, sample B, 29.4 pbw of Proglyde® DMM (trademark of Dow Chemicals) and 9.8 pbw of butyl glycol acetate were added. In the third sample, sample C, 29.4 pbw of Texanol® (trademark of Eastman Chemicals) and 9.8 pbw of methanol were added.

The three samples were then applied onto a metal substrate, Bonder® 26 60 OC (trademark of Chemetal GmbH), and evaluated after one day of drying. Film formation was good. Tests were carried out in order to determine the König and the Persoz hardness (in accordance with ASTM D4366), and the gloss (in accordance with ASTM D-523) and haze properties (in accordance with ASTM D-430). Test results are given in the following Table XVI:

TABLE XVI

| Sample | A | B | C |
|---|---|---|---|
| König hardness | 65 | 54 | 47 |
| Persoz hardness | 150 | 129 | 109 |
| Gloss 20° | 26 | 23 | 24 |
| Gloss 60° | 68 | 65 | 65 |
| Gloss 85° | 93 | 92 | 91 |
| Haze | 176 | 180 | 183 |

EXAMPLE 12

A stabilizing resin was made via emulsion polymerization. Phosphate ester was used as a surfactant (Rhodafac® RS710, ex Rhodia). A reactor was charged with compounds according to Table XVII.

TABLE XVII

| Reactor charge | Amount (pbw) |
|---|---|
| Demineralized water | 403.0 |
| Rhodafac RS710 ® | 3.71 |
| Sodium hydroxide (33% solution in water) | 0.51 |

The charged reactor was heated to 90° C. under a nitrogen blanket. When the batch reached a temperature of 90° C., a first initiator solution containing 0.84 pbw of sodium persulfate in 6.29 pbw of demineralized water was added. A pre-emulsion was made according to the following Table XVIII.

TABLE XVIII

| Component | Amount (pbw) |
|---|---|
| Demineralized water | 672.4 |
| Rhodafac RS710 ® (phosphate ester surfactant) | 22.06 |
| Sodium hydroxide (33% solution in water) | 3.39 |
| β-carboxyethylacrylate | 118.4 |
| Methyl methacrylate | 315.9 |
| Diacetone acrylamide | 20.45 |
| Butyl acrylate | 74.2 |
| Styrene | 59.1 |
| Mercapto ethanol | 8.2 |

This pre-emulsion was dosed in 120 minutes. A second initiator containing 6.9 pbw of sodium persulfate and 120.0 pbw of demineralized water was dosed in 150 minutes. After this addition, the batch was kept at 90° C. for 30 minutes. Then the batch was cooled to 70° C. A solution of 50.7 pbw of ammonia (25% aqueous solution) and 1,075.0 pbw of demineralized water was then added for neutralization to dissolve the polymer. Next, the solution was cooled to 30° C.

In the resulting aqueous solution a hydrophobic second polymer was prepared by the following steps. First, a reactor was charged with 493.8 pbw of the solubilized resin (with a solids content of 20.9%) and 55.3 pbw of demineralized water. This batch was then heated to 90° C. under a nitrogen blanket, while a pre-emulsion was made with the following components:

TABLE XIX

| Pre-emulsion | Amounts (pbw) |
|---|---|
| Stabilizing resin | 1,153.1 |
| Demineralized water | 128.6 |
| Styrene | 200.7 |
| 2-Ethylhexyl acrylate | 251.9 |
| Methyl methacrylate | 253.9 |
| Methacrylic acid | 24.1 |
| Adhesion promoter monomer | 48.2 |
| Diacetone acrylamide | 24.1 |

After the batch had reached 90° C., this pre-emulsion was dosed in 180 minutes and an initiator comprising 160.0 pbw of demineralized water and 2.2 pbw of sodium persulfate was dosed in 195 minutes. Feeding lines were rinsed with 60.0 pbw of demineralized water. The batch was kept at 90° C. for an additional 30 minutes and then cooled down to 65° C. Ammonia was added till a pH of 7.0–7.5 was reached. A booster was added for conversion. Subsequently, a crosslinker comprising 23.1 pbw of adipic bishydrazide was added together with 3.0 pbw of a biocide (Proxel® XL2). The pH of the batch was then adjusted to about 9 with a 25% aqueous ammonia solution.

A second resin solution of poly(dimethylaminoethyl methacrylate) was made by mixing a solution of 0.005 pbw of $FeSO_4.7H_2O$ in 3.52 pbw of demineralized water and a solution of 0.01 pbw of ethylene diaminotetra acetate in 1 pbw of demineralized water in a batch of 402.8 pbw of demineralized water, and heating to 65° C. After this temperature was reached, a solution of 251.8 pbw of dimethylaminoethyl methacrylate in 201.4 pbw of demineralized water, a solution of 2.5 pbw of tert-butyl hydroperoxide (70% aqueous solution) in 47.5 pbw of demineralized water, and a solution of 2.5 pbw of sodium formaldehyde sulfoxylate in 50.4 pbw of demineralized water were dosed in 120 minutes. Feed lines were rinsed with 20.1 pbw of demineralized water. The batch was kept at 65° C. for 60 minutes. Then 0.33 pbw of tert-butyl hydroperoxide (70% aqueous solution) and a solution of 0.08 pbw of sodium formaldehyde sulfoxylate in 2.5 pbw of demineralized water were added. The batch was kept at 65° C. for another 60 minutes. Then the batch was cooled to 30° C. and 13.4 pbw of ammonia (25% aqueous solution) were added.

The final composition was made by mixing 98.3 pbw of the poly(dimethylaminoethyl methacrylate) solution with 800.0 pbw of the first solution.

A white paint was prepared by mixing 100 parts of this composition with 35 parts of a pigment paste consisting of 6.3 parts of demineralized water, 0.8 parts of Disperbyk 190 (tradename of Byk Chemie), 0.3 parts of Surfynol 104 (50% solution in Proglyde DMM, tradename of Air Products), 0.3 parts of Dehydran 1293 (tradename of Henkel), 26.7 parts of titanium dioxide Kronos 2310 (tradename of Kronos) and 0.6 parts of a 10% solution of Serad FX1010 (tradename of Condea Servo bv).

To this mixture 0.3 parts of Dehydran 1620 (tradename of Henkel) were added. As coalescing aid 3 parts of butyl glycol were added. The following additives were added to the paint: 0.20 parts of Byk 301, 0.4 parts of Byk 348 (both trade marks of Byk Chemie), 0.2 parts of Corrosion inhibitor L1 (tradename of Erbsloh). A rheology modifier consisting of a solution of 1 part of a 10% aqueous solution of Viscalex HV-30 was added. Finally, the viscosity was adjusted by adding demineralized water until a viscosity of 25 sec was obtained using a DIN Cup 4 (according to DIN 53211). The resulting paint had a non-volatile content of 44% The volatile organic content was 77 g/l.

The paint was applied onto a glass panel (dry layer thickness 30 microns) and dried at ambient temperature. After 45 minutes of drying a tack-free coating was obtained. The hardness of the coating was measured after one and after three days at ambient temperature. The values found are:

| Hardness | König/Persoz |
|---|---|
| After 1 day | 66/133 |
| After 3 days | 72/154 |

We claim:

1. An aqueous cross-linkable polymer composition comprising:
   a) a water-soluble first polymer comprising acid groups, wherein said first polymer is at least partially neutralized with a volatile base;
   b) a dispersion of a substantially water-insoluble, second polymer, said second polymer comprising carbonyl-functional groups;
   c) a cross-linking agent capable of undergoing condensation reaction with the carbonyl-functional groups of the second polymer; and
   d) a water-soluble, amine-functional third polymer;
   wherein the weight ratio of the first polymer to the second polymer is between 60/40 and 5/95.

2. The composition of claim 1 wherein the number average molecular weight of the first polymer is between about 750 and about 15,000.

3. The composition of claim 1 wherein the first polymer is an emulsion polymerization reaction product of styrene and at least one (meth)acrylate ester.

4. The composition of claim 1 wherein the first polymer is an emulsion polymerization reaction product of (meth)acrylic acid and at least one (meth) acrylate ester.

5. The composition of claim 1 wherein the first polymer further comprises carbonyl-functional groups.

6. The composition of claim 5 wherein the carbonyl-functional groups of the first polymer and the second polymer are the carbonyl groups of the polymerization product of diacetone acrylamide monomer with other monomers.

7. The composition of claim 1 wherein the carbonyl-functional groups of the second polymer are the carbonyl groups of the polymerization product of diacetone acrylamide monomer with other monomers.

8. The composition of claim 1 wherein the third polymer is poly(dimethylaminoethyl methacrylate).

9. The composition of claim 1 wherein the cross-linking agent is adipic dihydrazide.

10. The composition of claim 1 wherein said volatile base is ammonia.

11. The composition of claim 1 wherein said second polymer is produced by emulsion polymerization in the presence of an aqueous solution of the first polymer.

12. An aqueous cross-linkable polymer composition comprising:
    a) a water soluble first polymer comprising acid groups, wherein said first polymer is at least partially neutralized with a volatile base;
    b) a dispersion of a substantially water-insoluble, second polymer, said second polymer comprising carbonyl-functional groups;
    c) a cross-linking agent capable of undergoing condensation reaction with the carbonyl-functional groups of the second polymer and
    d) a water soluble, amine-functional third polymer.

* * * * *

UNITED STATES PATENT AND TRADEMARK OFFICE
CERTIFICATE OF CORRECTION

PATENT NO. : 6,730,740 B1
DATED : May 4, 2004
INVENTOR(S) : Mestach et al.

It is certified that error appears in the above-identified patent and that said Letters Patent is hereby corrected as shown below:

<u>Title page,</u>
Item [57], ABSTRACT
Line 2, "composition comprising: W" should read -- composition comprising: --
Line 15, should read -- The invention also pertains to a process for preparing such an aqueous polymer composition. --

Signed and Sealed this

Fourth Day of January, 2005

JON W. DUDAS
*Director of the United States Patent and Trademark Office*